United States Patent

[11] 3,556,021

[72] Inventor Anthony J. Rossi
40 Kashey St., Clifton, N.J. 07013
[21] Appl. No. 724,120
[22] Filed Apr. 25, 1968
[45] Patented Jan. 19, 1971

[54] METHOD FOR EXTRUDING CANDY FILLINGS HAVING A HIGH PERCENTAGE OF SOLIDS
8 Claims, 2 Drawing Figs.

[52] U.S. Cl. .................................................. 107/54, 107/14
[51] Int. Cl. .................................................... A23g 1/70
[50] Field of Search ........................................ 107/54.6, 54.2, 14.2, 14.3

[56] References Cited
UNITED STATES PATENTS
1,393,144 10/1921 Laskey ........................ 107/54(.6)
3,225,821 12/1965 Sollich ........................ 107/54(.6)

Primary Examiner—Laverne D. Geiger
Assistant Examiner—Robert I. Smith
Attorney—Hill, Sherman, Meroni, Gross & Simpson ABSTRACT: Method and apparatus for extruding high solid content candy fillings to size in which the candy filling is deposited into the hopper of a worm-type extruder and is reduced and pressurized by this extruder and is then picked up by a high-pressure high-viscosity piston pump in communication with a reducer, and ejected by the piston pump under high pressure to the final size of the filling. A Teflon-lined high-pressure hose is connected with the discharge end of the pump. A heavy-duty pipe is connected with the discharge end of the hose, and may be formed at its discharge end to shape the filling to a desired size.

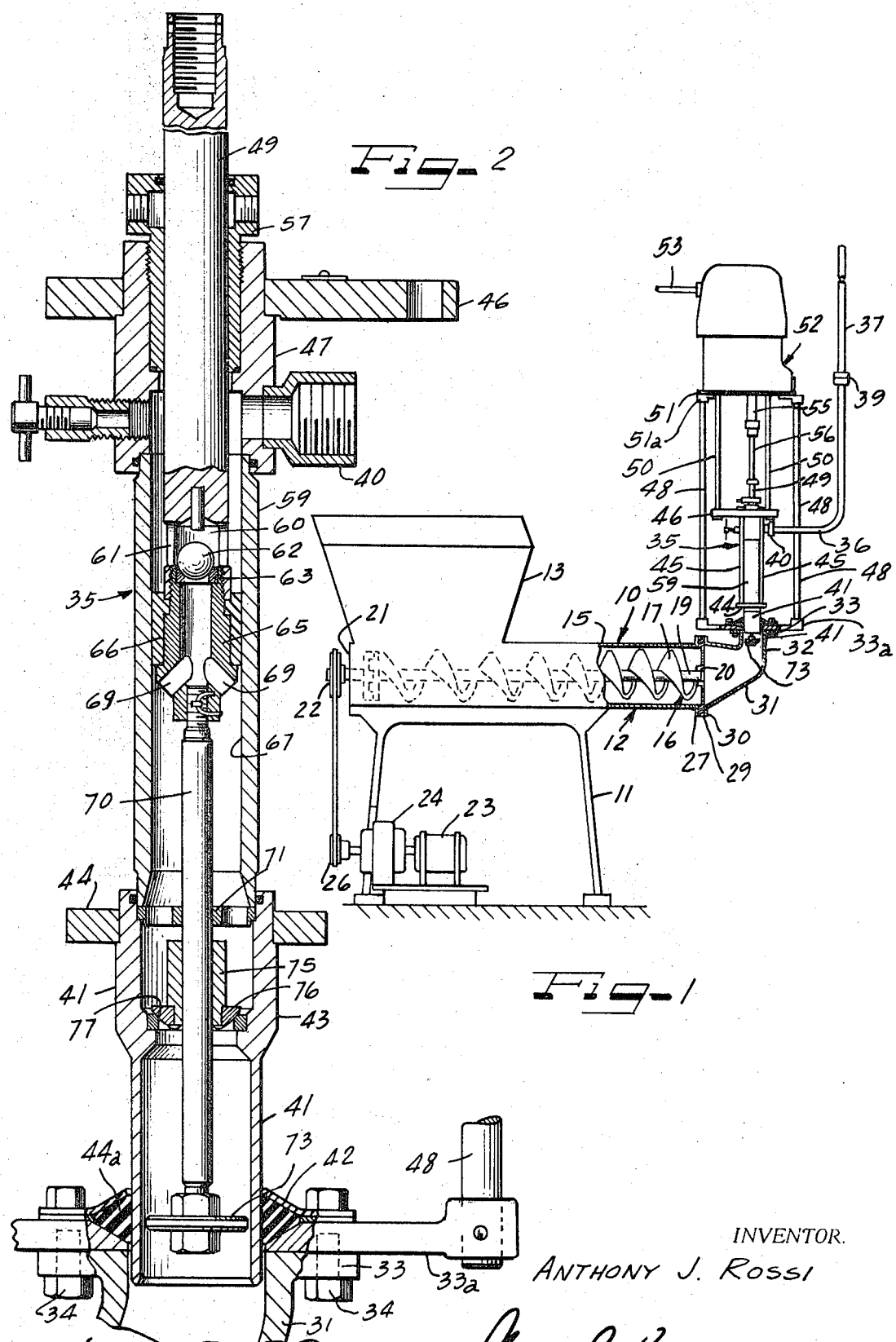

METHOD FOR EXTRUDING CANDY FILLINGS HAVING A HIGH PERCENTAGE OF SOLIDS

BACKGROUND OF THE INVENTION

Heretofore candy fillings have been extruded by injecting the fillings along a duct. These extruders and injectors, however, will only handle jelly-types of fillings and will not handle fillings having a consistency of over 75 percent to 78 percent solids. Where the filling is a caramel filling or a like type of filling having a consistency of from 92 percent to 98 percent solids, the practice has been to roll the filling by hand to a size of from 6 to 8 inches in diameter and to then dump the filling into a batch roller, having tapered rotating rolls which spin the filling to the size required to be fed into the filling equipment, enclosing the filling in an outer jacket of hard candy. These operations of forming the filling are primarily hand operations requiring a great deal of manual labor and are time consuming and are not conducive to the mechanical production of filled candies.

SUMMARY AND OBJECTS OF THE INVENTION

The present invention provides a mechanical method and apparatus for producing candy fillings having a high percentage of solids by placing the mixed filling into a hopper and extruding the filling under pressure through a reducer fitting, and by then picking up the pressurized filling by the pickup scoop of a high-pressure reciprocating pump further pressurizing the filling to a high pressure and ejecting the pressurized filling to a preselected size, at a temperature at which it will retain its shape, into a hard candy jacket.

A principal object of the present invention is to improve upon the methods and apparatuses of making high solid content candy fillings by extruding the filling to size in a series of successive and continuous high-pressure extruding operations.

Another object of the invention is to provide an improved apparatus for extruding high solid content candy fillings to size, arranged with a view toward obtaining the pressure to extrude high solid content fillings in a series of two step continuous pressurized reducing operations.

A further object of the invention is to provide an improved mechanical process for extruding high solid content candy fillings to a selected size, by utilizing a worm-type extruder extruding the filling to an adapter, and by connecting a high-pressure reciprocating pump to the discharge end of the adapter and picking up the pressurized extruded filling therein and further pressurizing and ejecting the filling to a selected size into a hard candy jacket, at a temperature at which it will retain its shape.

These and other objects of the invention will appear from time to time as the following specification proceeds and with reference to the accompanying drawings wherein:

FIG. 1 is a diagrammatic view in side elevation of an extruding apparatus constructed in accordance with the principles of the present invention; and FIG. 2 is a vertical sectional view taken through the pickup end of a high-pressure pump of a type that may be used to pressurize and feed the filling into an outer candy coating or jacket.

DESCRIPTION OF PREFERRED EMBODIMENT OF INVENTION

In the embodiment of the invention diagrammatically illustrated in the drawing, I have shown in FIG. 1, a high solid content filling extruder and injector 10 including a frame 11 supporting a worm-type extruder 12 in spaced relation with respect to the ground.

The worm-type extruder 12 includes a hopper 13 at the receiving end thereof into which the filling is deposited and a closed conduit 15 leading therefrom, generally conforming to the form of a worm 16. The worm 16 is shown as being in the form of a scroll 17 on a shaft 19 rotatably mounted at the discharge end of the conduit in a bearing support 20. The opposite end of the shaft 19 extends through a rear end wall 21 of the hopper 13 and is suitably journaled in said rear end wall. A pulley 22 on the outer end of said shaft is driven from a motor 23 and speed reducer 24. A belt 25 trained about a speed reducer drive pulley 26 has driving engagement with the pulley 22, for driving the shaft 19.

The conduit 15 has a radially outwardly extending flange 27 at its discharge end, abutted by a ring 29 forming a support for the bearing support 20. The ring 29 in turn is abutted by a flange 30 of an adapter fitting or reducer 31. The flange 30 and ring 29 and flange 27 are connected together by bolts (not shown) or any other suitable securing means, and may be sealed in a conventional manner.

The reducer 31 is herein shown as being in the form of an elbow having a right angled upwardly extending discharge end 32 having a flange 33 extending thereabout. The fitting 31 need not necessarily be an elbow or reducer, but may be a straight adapter fitting. The flange 33 forms a mounting for a high-pressure reciprocating pump 35. The pump 35 is herein shown as being an air operated pump of a type manufactured by Gray Company, Inc. Minneapolis, Minnesota, and is no part of the present invention, except insofar as it forms a pickup and pressurizing means for the extruded high solid content filling, for injecting the filling through a high-pressure hose 36 connected at its discharge end with an extra heavy relatively long pipe 37, through a high-pressure coupling 39. The high-pressure hose 36 is shown as being connected with an outlet 40 from the pump and is preferably Teflon lined and constructed to stand pressures of 2,000 p.s.i. and over. The extra heavy pipe 37 and coupling 39 are constructed to stand similar pressures and may be sized to effect the injection of a filling to size. The discharge end of the pipe 37 may also be shaped in any suitable manner to form the filling to a desired shape. In the present instance, the hose 36 and pipe 37 are between 15 feet and 20 feet long and usually extend horizontally or at an angle inclined with respect to the horizontal, although the length may be varied for various fillings and conditions.

The pump 35 includes a generally cylindrical intake housing 41 having open ends and having a bracket 44 extending radially of its upper end portion. Rods 45 extending through the bracket 44, support a bracket plate 46 on the top of a cylindrical guide and housing portion 47 for a connecting rod 49 for the pump and connected at its upper end to the piston (not shown) of an air motor 52. Rods 50 mounted on and extending upwardly of the bracket plate 46 have supporting connections with a bracket plate 51 for the air motor 52. The bracket plate 51 is also supported on a bracket 51" engaging the undersurface thereof and extending radially outwardly therefrom. The bracket 51" is supported on the upper ends of rods 48 extending upwardly of an annular bracket 33" supported on the flange 33 and secured thereto, as by machine screws 34.

The inner upper face of the annular bracket 33" is beveled to receive a grommet seal 44", retained thereto as by an annular retainer 42.

The air motor 52 is of a reciprocating type including a piston (not shown), reciprocably moved by air supplied to the motor through an air inlet 53. The piston (not shown) has a piston rod 55 depending therefrom connected with the connecting rod 49 through a coupling link 56.

As shown in FIG. 2, the connecting rod 49 is reciprocably guided in the cylindrical housing and guide 47 in a bearing and packing member 57 and depends therefrom along the housing 47 into a cylinder 59, connected between the housing 47 and the upper end portion of the intake housing 41. The connecting rod 49 has a hollow lower end portion 60 having openings 61 leading through the wall thereof, and forming a cage for a ball-type valve 62. The valve 62 is seated on a valve seat 63 on the upper end portion of a hollow body 65 for a piston 66 reciprocably moved along an internal cylindrical wall 67 of the cylinder 59 upon reciprocable movement of the piston rod 55. Ports 69 lead from the bottom of the piston body 66 into the hollow interior portion of said piston body.

The piston body 65 in turn has a rod 70 threaded therein and depending therefrom through a guide 71 in the upper end portion of the housing 41. A pickup scoop or plate 73 is suitably mounted on the lower end of the rod 70 and is moved by the piston of the air pump 52 beneath the discharge end of the housing 41 to pick up the pressurized high solid content filling in the reducer 31 forced thereto by the worm 16, and lift and pressurize said filling upwardly through the housing 41 and along the cylindrical wall 67 of the cylinder 59. A sleeve 75 is slidably mounted on the rod 70 beneath the guide 71, and has a valve 76 on its lower end, seating against a valve seat 77 in the housing 41 upon the downstroke of the piston 66. The guide 71 for the rod 70 also forms a stop to limit upward movement of the valve 76.

The pump 35 is of a type in which air under pressure may be admitted to the inlet 53 to reciprocably move the piston 66 along the cylindrical wall 67 of the cylinder 59 and force the filling to move along said cylinder and pressurize the filling at pressures of at least 20 times the pressure of the air entering the inlet 53. In the present apparatus and process, it is desirable that the filling be pressurized at pressures in the order of 2,000 p.s.i., although the pressures may be increased where required, dependent upon percentage of solids in the filling and the pressures required to extrude the filling through the hose 36 and pipe 37. The pressures, of course, are also dependent upon the diameter of the hose 36 and pipe 37.

In carrying out the process of the present invention, a mixed candy filling of a high solid content which usually contains from 92 percent to 98 percent solids is supplied to the hopper 13. Assuming the motor 23 is in operation and is rotatably driving the worm 16, the filling in the hopper 13 is fed and extruded by the worm 16 along the cylindrical conduit 15 and reducer fitting 31 and is forced under pressure along the reducer 31 to be picked up by the scoop 73 on the end of the rod 70, of the high-pressure pump 35. The scoop 73, picking up the candy filling forced thereto by the worm 16, forces the filling upwardly along the housing 41 and interior cylindrical wall of the cylinder 59 on the upstroke of the piston 66. The continuous picking up of the high solid content filling by the scoop 73 will pressurize and advance the filling along the interior portion of the piston body 65 past the check valve 62 and out through the outlet 40 along the high-pressure hose 36 and heavy duty pipe 37. The pump 35 pressurizing the filling to pressures of the order of at least 2,000 p.s.i. forces the filling through the hose 36 and pipe 37 and raises the temperature of the filling from 125° to 140° F, at which temperature and consistency, the product will retain its shape on being discharged from the end of the heavy duty pipe 37. The filling may then be injected into a candy coating or may be coated in any conventional manner.

It may be seen from the foregoing that a simple system and apparatus has been provided for mechanically extruding high solid content fillings to size, in which the extruding is attained by first extruding and pressurizing the filling along a fitting and forcing the filling to the pickup scoop of a high pressure reciprocating pump, pressurizing and extruding the filling at a relatively high-pressure and effecting the shaping of the filling to a desired size.

It should also be understood that various forms of extruders and pumps may be used to carry out the process of the invention, arranged to pressurize the filling in low- and high-pressure stages, with an adapter or reducer between the stages.

While I have herein shown and described one form in which the invention may be embodied, it may readily be understood that various variations and modifications in the invention may be attained without departing from the spirit and scope of this novel concepts thereof.

I claim:

1. A method of extruding high solid content candy fillings to size comprising the steps of:
   supplying a high solid content filling for extruding;
   feeding the high solid content filling under pressure and pressurizing the filing so fed;
   forcing the pressurized filling through a reducer; and
   picking up the filling so forced from the reducer and substantially increasing the pressure of the filling and extruding the filling to size under high pressure at a temperature and consistency at which the filling will retain its shape when extruded.

2. The method of claim 1, wherein the operation of picking up the filling from the reducer and increasing the pressure on the filling picked up and extruding the filling to size is a high-pressure pumping operation.

3. The method of claim 1, wherein the step of feeding the high solid content filling under pressure and pressurizing the filling so fed while maintaining the filling under pressure, is an extruding operation.

4. The method of claim 1:
   wherein the feeding and reducing step is an extruding step;
   wherein the step of picking up the filling is a high-pressure pumping step; and
   wherein the feeding and reducing step is also a forcing step, forcing the filling to the pickup and reducing step.

5. The method of claim 4, wherein the pressurized filling is confined for a relatively long path of travel at the termination of the pumping step and is reduced to size at a temperature where the filling will retain its shape as reduced and discharged from its confinement under pressure.

6. The method of claim 1:
   wherein the feeding and reducing step is attained by the provision of a worm extruder;
   wherein the pumping step is attained by a high-pressure reciprocating pump; and
   wherein the feeding and reducing step forces the pressurized and reduced filling to the pumping step.

7. The method of claim 1, wherein the high solid content filling has a solids content in the range of between 92 percent and 98 percent solids.

8. The method of claim 7, wherein the pressure of the filling extruded to size is of the order of 2,000 pounds per square inch.